Patented Oct. 17, 1950

2,525,835

UNITED STATES PATENT OFFICE 2,525,835

PROCESS FOR THE PREPARATION OF COATED PIGMENT PARTICLES

Alfred F. Schmutzler, Teaneck, N. J., and Donald F. Othmer, Coudersport, Pa.

No Drawing. Application August 26, 1947, Serial No. 770,754

6 Claims. (Cl. 106—308)

This invention relates to pigment-in-oil preparations and their process of manufacture.

Pigment-in-oil pastes constitute high concentrations of coloring materials in water-immiscible vehicles. They are ready-made raw materials for the manufacture of surface coatings, as the incorporated colors are sufficiently well suspended to require no further milling or grinding. They may be made by mixing the pigment with a suitable vehicle and then milling this mixture on a roller mill. A more direct process, which obviates several unit operations in the manufacture of colors, is called "flushing." It eliminates the necessity of drying the wet pigment and handling the dry fluffy powder by processing the pigment-filter cake, as obtained after filtering and washing of the precipitated pigment, with a water-immiscible vehicle in the presence of a surface-active agent. It consists of thinning the wet pigment with water to a cream-like consistency and mixing it with the vehicle in a powerful kneader, which effects the transfer of the pigment-in-water phase to a pigment-in-oil paste.

The disadvantages of the flushing process are high labor and power costs and the presence of a surface-active agent in the resulting pigment-in-oil paste, which is troublesome occasionally. The use of a surface-active agent can be obviated at even higher power costs by passing a thin pigment slurry simultaneously with an oily vehicle several times through a colloid mill. This procedure actually amounts to squeezing the pigment particles into tiny droplets of oil.

A simpler procedure consists in mixing an emulsion of the oily vehicle with the pigment slurry and then breaking the emulsion. This is done directly in vats and reaction tanks, equipped with sweep agitators, using either water-soluble soaps or heat-coagulable proteins as the emulsifying agents. In this process, the fatty acids from the soaps or the coagulated proteins are incorporated in the pigment-in-oil paste.

The emulsion processes are not well adapted for pigments which are prepared in narrow ranges of hydrogen ion concentrations, such as lakes and toners of organic dyes, chrome yellow pigments or the like. In the manufacture of lakes and toners, a rigid pH control is necessary to strip the dye completely from its solution, also called "striking solution," because in it, the dye is struck on the precipitant. If the pigment slurry is made less acid, some color redisperses. Such a condition is called a "bleed;" it constitutes a loss in the color value of the pigment, as obtainable from a given value of dye. During the precipitation of chrome yellow pigments, the slurry of pigment depends upon the pH range for its proper hue. A change from the optimum condition of hydrogen ion concentration causes variations in the shade of the color.

It has been found that the vehicle can be adsorbed by the pigment in substantially the pH ranges or hydrogen ion concentrations, such as are required for optimum precipitating conditions for lakes, toners, chrome yellows or the like, in the absence of surface-active agents, with the formation of pigment-in-oil preparations. The oil adsorption is conveniently carried out immediately after the completion of the pigment-forming operation, by feeding the water-immiscible vehicle to the pigment slurry in a state of very fine subdivision, which exists in an atomizer spray or in an emulsion. The resulting pigment-in-oil preparation behaves like the oil-free pigment; it can be filtered, and its filter cake or press cake can be washed free of water-soluble impurities.

This new process can be practiced with the same advantages, and none of the disadvantages, of the emulsion processes; it eliminates additional handling of the pigment slurry by having the oil adsorbed after the completion of the pigment-forming operation in the striking tank. It, furthermore, obviates the incorporation of foreign fatty acids or coagulable proteins by either introducing the oily vehicle as an atomized spray or in the form of an alkaline emulsion, made with a small amount of aqua ammonia. In the latter procedure, the native fatty acids of the oil or varnish, usually defined as acid number of the vehicle, apparently assist in the emulsification, while the salts of ammonia formed, when the emulsion is broken by the mineral acids in the pigment slurry, can be washed out due to the nature of the filterable nature of the oil-coated pigment particles. An additional advantage may be realized by the proper addition of an irreversible dispersed resin, which in the acid slurry converts to an oil-soluble or infusible resin. A subsequent flocculation of the fine particles either prior or after the oil adsorption process, due to the above addition, usually results in more rapid filtering rates and shortening of washing time of the press cake.

In the "flushing" procedure, the pigment is transferred from an aqueous to an oil dispersion by the kneading action of a powerful kneader, in the presence of a surface-active agent. At one stage, the pigment and the water-immiscible vehicle form a tough, sticky mass. The water which is squeezed out of this mass is slightly colored. Some loss of pigment is caused by the discard of this water phase. Such a loss is obviated by the oil adsorption process; all of the oil-coated pigment particles are recovered as filter cake.

It is possible to cause the adsorption of small proportions of an oil by Rhodamine toner, by just adding the water-immiscible vehicle in bulk to the pigment slurry in moderate turbulent motion as is customary in wooden pigment-striking tanks. With very fast agitation, substantially larger proportions of the oil will be adsorbed, but in the usual wooden striking tanks such speed appears undesirable and it is not necessary if the vehicle is fed to the pigment slurry as an alkaline emulsion. As the emulsion enters the very acid, freshly-precipitated pigment slurry, it is broken like any other emulsion depending upon alkaline conditions for stability, when it is made acid. Under the same conditions of agitation in a full four liter beaker, it can be observed that a very large portion of the tiny, invisible droplets in such an alkaline oil-in-water emulsion, fed to the bottom of a beaker, have conglomerated to fairly large visible drops prior to rising completely to the surface in a clear aqueous acid solution. It has been found that the oil has to be in a very fine state of subdivision for substantially complete adsorption. The mechanism of this process is assumed to depend on electrostatic charges of the particles. As a rule, the oil droplets in an oil-in-water emulsion carry the opposite electrostatic charge than that of the water phase. This is generally applicable to all colloids and suspensions. It seems that the inherent tendency of oppositely charged particles to attract each other makes the oil adsorption process to function satisfactorily.

Emulsions in the alkaline solutions may be made commercially by mixing the water-immiscible vehicle, such as linseed oil or linseed oil varnish, with a dilute ammonia solution in the usual rate tanks, which are equipped with a slow speed stirrer. In the absence of an emulsifying agent or alkaline conditions, the preparation of emulsions requires a colloid mill, a high speed stirrer or a homogenizer. Depending upon the characteristics of the water-immiscible vehicle, such as viscosity, specific gravity or the like, such emulsions are made from 30 to 60% oily vehicle and the remainder being water; they are usually not stable, breaking within one or two minutes on standing. Though unstable these emulsions might be, an immediate transfer to the pigment slurry results in a satisfactory adsorption of oil by the pigment. The advantages of this procedure, as compared with the method of passing a slurry of a press cake of pigment simultaneously with an oily vehicle several times through a colloid mill or a homogenizer, are (1) the reduction of the charges of materials to the colloid mill or homogenizer, (2) eliminating at least one unit operation in the process of manufacture of pigment-in-oil pastes, and (3) the use of less equipment.

The manufacture of pigment-in-oil pastes by this new oil adsorption process requires four essential unit operations, as follows:

(1) Pigment precipitation and subsequent oil adsorption in the same tank, in which the pigment was made.

(2) Filtering of the resulting oil-coated pigment particles and subsequent washing of the resulting filter cake.

(3) Drying of the water-wet pigment-in-oil pulp to remove adhering water. This results in a dry pigment-in-oil filter press cake, which may be handled like an oil-free filter press cake after drying.

(4) Milling or grinding of the dry pigment-in-oil press cake, without additional oil or vehicle, in order to obtain the pigment-in-oil paste.

An auxiliary unit operation might be designated as forming the emulsion, which may be done either by mixing the ammoniacal solution with the oily vehicle or by subjecting the oil and water phases to the homogenizing action of a high speed stirrer, a colloid mill or a homogenizer. The total of unit operations including this auxiliary step numbers five. This process compares with the method of feeding simultaneously a slurry of a pigment with the water-immiscible vehicle several times through a colloid mill, as follows, with the unit operations listed below pertaining to the latter method:

(1) Pigment precipitation, followed by (2) Filtration and subsequent washing of the filter press cake.

(3) Slurrying or thinning the filter press cake in a suitable tank, provided with an efficient stirrer, to a cream-like consistency. In the case of Rhodamine toner, such a slurry contains 5 to 15% pigment.

(4) Simultaneous feeding the slurry from (3) with the water-immiscible vehicle through a colloid mill several times or once through a series of colloid mills or homogenizers.

(5) Filtration of the resulting suspension.

(6) Drying.

(7) Milling or grinding.

In both processes, the last two operations can be combined by placing the water-wet filter cake of the oil-coated pigment particles on a hot roller mill. As pointed out earlier, the advantage of the oil adsorption process is the smaller charge in the colloid mill or homogenizer, if it is desired to make an emulsion without ammonia.

In the manufacture of pigment-in-oil pastes from chromium-Rhodamine B phosphotungstic acid toners, which are preferably precipitated in a very acid solution with a pH in the range from 1.4 to 1.9, it was noticed that some of the oil was lost. This loss was probably caused by oxidation or hydrolysis or a combination of the two reactions, in which an excess of dichromic acid and the presence of tiny pigment particles might play important roles. The elimination of the first could be done by a number of weak reducing agents and the other by agglomerating or coating the particles which might otherwise act as catalysts in the hydrolysis. The most convenient way seemed to be the addition of either water-soluble or alcohol-soluble reactive resins. Small portions of resins, preferably prepared with an excess of aldehyde and kept in an aqueous dispersion by adjusting to the proper alkaline conditions, were added to the pigment slurries of the above-mentioned Rhodamine B toner, at temperatures as high as the natural boiling point of such freshly prepared pigment slurries, prior to the feeding of the emulsions of the water-immiscible vehicles, to these slurries. The losses of oily vehicle were considerably reduced by this procedure.

The mechanism of the resins during the oil adsorption process is assumed to be twofold:

(1) The excess of aldehyde and probably some of the methylol groups reduce the chromium from a hexavalent to a tervalent state.

(2) The resin causes the formation of an inert envelope about tiny colloidally dispersed particles and prevents them from acting as catalysts.

The apparent function, for which some proof is available, is that of a dispersing agent for the pigment prior to the dehydration of the wet filter press cake. Under proper conditions, the pulp of the pigment-in-oil particles forms stable suspensions on slurrying with water. The maximum volume to which the yield of an example could be diluted was called the "Maximum Emulsion Volume." This is a convenient method of manufacture of water-emulsion paints, as suspensions of resins or film-forming materials may be mixed with these filter cakes to form stable suspensions. After application as surface coatings of such suspensions, continuous films are formed. Their drying rate depends upon the evaporation of the water and thinner and the rate of oxidation of the vehicle.

During the drying process, the reactive resins become water-insoluble. Depending upon the length of drying time and temperature, these resins can be converted into oil-soluble resins or into infusible plastics. The dry pigment-in-oil pulp exhibits no signs of redispersing in aqueous media; furthermore, those pigment-in-oil pastes, which were processed with aqueous dispersions of reactive phenolic resins, require additional emulsifying agents for making the corresponding emulsion paints.

In the manufacture of bronze blue, the pigment slurry is very acid. It is customary to let the pigment settle and decant the supernatant liquid, add fresh water and repeat this washing procedure by decantation. The oil-adsorption process is preferably applied with this pagment at or after the third washing by decantation, when the pH of the slurry has been raised from below 1 to about 5. The industry resorted to decantation since the filtration of the pigment proceeds very slowly. By mixing a reactive resin with the pigment slurry at a fairly low pH, the pigment assumes a more rapid filtering rate, without apparently affecting the quality of the color. After properly adsorbing the vehicle on the pigment, it may be filtered and washed to remove all water-soluble impurities.

Bronze blue, like all other iron blue pigments, is very sensitive to alkalies and the usual emulsion processes, which require the mixing of the pigment slurry with an alkaline oil-in-water emulsion with subsequent breaking the emulsion by neutralizing or acidifying after a sufficient length of stirring, seem to effect the quality of the color, while the oil adsorption process is readily applicable, as described. Some difficulties might be encountered during the drying of the pigment-in oil pulps, as the drying oils are readily oxidized in these pulps. However, by drying in a vacuum dryer or in an atmosphere of an inert gas, which precludes contact with oxygen, or by milling the pulp on hot rollers, no difficulties will be encountered.

A very pH-sensitive class of pigments are the chrome yellows, since their shade is effected by even small changes of hydrogen ion concentrations. The oil adsorption process is applicable to the freshly precipitated pigment, which may slurry in its striking solution. If the conveniently prepared alkaline emulsion should be used, it is necessary to feed the emulsion simultaneously with an acid solution from a separate feedline into the pigment slurry at corresponding rates so that the pH range is not disturbed. Though the ideal condition would be a steady hydrogen ion concentration during the complete adsorption process, a slight variation toward a lower pH did not noticeably affect the quality of the color, as long as the final pH assumed that of the end of the precipitation condition. A more convenient procedure is the feeding of a neutral emulsion to the pigment slurry so that the pH range of the precipitating conditions is not disturbed.

The freshly precipitated pigments in their acid slurries have the tendency to cause a considerable loss of vegetable oil or varnish, especially if the oil adsorption process is applied at low pH ranges. The method of substantially reducing this loss consists in coating the pigment particles with resins, as described in connection with Rhodamine B toners. In low pH ranges, it is convenient to add an alkaline aqueous solution of the reactive resin to the pigment slurry. If a small portion of such a solution is poured into a large body of agitated water, preferably acidified with a strong mineral acid, the resin remains finely divided and does not settle for some time. However, the pigment particles readily adsorb the resin. It is assumed that there remains a small amount which is not adsorbed and may act as a suspension-forming agent; it is known that finely divided solids are apt to act as emulsifiers in systems of immiscible liquids. The tendency of the wet pigment-in-oil pulp to form suspensions or emulsions is destroyed during the removal of the water.

Though the water-soluble or aqueous dispersions of reactive resins, which turn water-insoluble to become oil-soluble or completely insoluble and infusible in acid slurries at room or elevated temperatures, are preferred, there are other materials suitable for the same purpose. Among them are dispersions and solutions of resins in water-miscible alcohols, such resins as phenol modified indene-coumarone resins (also called Nevillacs, such as Nevillac soft, Nevillac hard, Nevillac RT, Nevillac RA, Nevillac OP or the like), alcohol-soluble ester gum, alcohol-soluble phenolic resins, alcohol dispersions of urea-formaldehyde resins, alcohol dispersions of melamine-formaldehyde resins, alcohol-soluble vinyl polymers, furfural-acetone polymers, furfural-formaldehyde polymers or the like. Instead of alcohol, other water-miscible solvents, such as acetone, paraldehyde, acetic acid or the like, may be used, especially for the vinyl polymers, furfural-aldehyde polymers, chlorinated rubber, and modified-phenol-formaldehyde resins. The soft resinous materials and the viscous synthetic resins seem to have the universal tendency to cause flocculation. Their addition to slurries of very fine pigment particles, such as iron blues, improves their filterability.

Compounds capable of condensing with each other, such as furfural, monomethylol urea, dimethylol urea, trimethylol melamine, hexamethylol melamine or the like, may be used for coating the pigment particles in their acid slurries. It is advantageous to add these compounds as dilute aqueous or alcoholic solutions or as solutions in some water-miscible solvent, such as a glycol, aldehyde or ketone, in order to obviate the formation of large particles of resinous material.

Some pigments have the undesirable property of delaying or preventing the drying of printing inks and paints. The cause is assumed to be the adsorption of the drier, a catalyst added to the vehicle to speed up its oxidation and polymerization. It has been found that treating such a pigment, like titanium dioxide, by adsorbing a solid resin, a viscous synthetic resin, a drying oil or a mineral oil in amounts less than required for the formation of pigment-in-oil pastes considerably reduces the effect of the pigment, by substantially reducing the loss of drying on storage. This treated pigment after drying of the filter press cake is in the form of solid lumps, which have to be powdered before it can be used in a paint or printing ink.

The following are non-limitative examples, in which the proportions are given by weight:

Example I

To a slurry of Rhodamine B phosphotungstic acid toner, containing 12.2 grams of pigment in 3000 parts of striking solution, at 30° C., an emulsion consisting of 15 parts of linseed oil varnish of a viscosity of 9.5 poises and containing ¼% anti-skinning agent, ½ part of 29% aqua ammonia and 34 parts of water is added through a tube below the surface of the agitated slurry. Stirring of the slurry is continued for ½ hour, after all of the emulsion has been added. The acid slurry has a hydrogen ion concentration corresponding to a pH of about 2; it is filtered, the filter cake is washed until the wash water is neutral to litmus paper. Then the pigment-in-oil pulp is dried in vacuum driers, maintained at about 60° C. The resulting preparation appears like a solid, which is milled on roller mills to a pigment-in-oil paste. If the yield is 25 parts of paste, as expected, the pigment concentration is about 48%.

Example II 3000 parts of pigment slurry, containing 12 parts of freshly precipitated chromium-Rhodamine B phosphotungsticmolybdic acid toner, of a pH of about 1.6, is agitated and held at a temperature of about 60° C., while 10 parts of phenol-formaldehyde resin dispersion is added rapidly. Stirring is continued for one hour. Then an emulsion consisting of 11 parts linseed oil varnish, ½ part 29% aqua ammonia and 25 parts water is added through a tube below the surface of the agitated slurry and stirring is continued for one additional hour. The pH of the oil-coated pigment slurry is about 2.5.

The yield of pigment-in-oil paste expected is 23.2 parts, with a pigment concentration of about 52%.

If the washed filter cake is not dried, but mixed with water, a stable suspension of the oil coated pigment particles can be made, as long as the volume of the total does not exceed the equivalent of 200 parts of water.

The above-mentioned phenol-formaldehyde resin dispersion may be made as follows: 94 parts of phenol and 122 parts of 37% formaldehyde solution are heated to 90° C. in the presence of 2½ parts of 50% sodium hydroxide solution and held at 90° C. for ¾ hour. Then the charge is cooled rapidly to room temperature and it is diluted gradually first with 120 parts of 29% aqua ammonia and then with 760 parts of water. This dispersion is stable for several weeks if stored in the cold. A small portion of the dispersion added to a large body of an acid solution will form a colloidal dispersion of phenol-formaldehyde resin, but when the alkaline phenol-formaldehyde dispersion is diluted gradually, the resin separates out as a very viscous oil, which on drying at 60° C. becomes a solid resin and is insoluble in water after the complete removal of moisture.

Example III 10 parts of phenol-formaldehyde resin dispersion, as described in Example II and containing 1.1 part of resin, are added to 3000 parts of pigment slurry, containing 12.0 parts of chromium-Rhodamine B phosphotungsticmolybdic acid toner, at 60° C. while being well agitated. Stirring is continued for one hour, then the slurry is filtered, the filter cake is washed free of acid and then dried. The yield of resin-coated pigment is 13 parts.

If before drying, the filter cake is mixed with water, a stable suspension of resin-coated pigment can be made. However, if the filter cake is dry, no such suspension can be made by merely adding water.

Example IV 10 parts of phenol-formaldehyde resin dispersion, as described in Example II and containing 1.1 part of resin, are added to an agitated slurry of 12 parts of chromium-Rhodamine B phosphotungsticmolybdic acid toner in a volume of about 3000 parts acid solution at its boiling point. Boiling and stirring is continued for 15 minutes, then the slurry is cooled to about 60° C. and filtered. The filter cake is washed until the wash water remains neutral to litmus.

After drying, a yield of 13.1 parts resin-coated pigment is obtained. The pigment is not readily dispersible in pure water, and its suspensions are unstable.

If the washed filter cake is not dried, it can be mixed readily with water with the formation of thin, though thixotropic, stable suspensions of pigment-in-water.

Example V 10 parts of phenol-formaldehyde resin dispersion, as described in Example II and containing 1.1 part of resin, are added to an agitated slurry of 12 parts of chromium-Rhodamine B phosphotungsticmolybdic acid toner in a volume of about 3000 parts acid solution at its boiling point. After the addition, boiling and stirring is continued for 15 minutes, then the slurry is cooled to 60° C. and an emulsion, consisting of 10 parts pale yellow linseed oil with a viscosity of 0.34 poise, ½ part of 29% aqua ammonia and 20 parts water, is added through a tube below the surface of the slurry and the resulting slurry is stirred for one hour longer. It is filtered, washed and the filter cake is dried in vacuum driers at 60° C. The resulting dry cake is worked into a paste on roller mills. If the yield is 22.4 parts of paste, as expected, the pigment concentration is 53½%.

Example VI 100 parts of modified phenolic resin (Beckacite #1112) and 200 parts of linseed oil were cooked into a varnish for 1 hour at 510° C. 15 parts of this varnish was emulsified with 34 parts of water and 1.0 part of 29% aqua ammonia and added to a pigment slurry containing 13.1 parts of resin-coated chromium-Rhodamine B phosphotungsticmolybdic acid toner in 3500 parts of a very acid solution (of a pH of about 2) at 60° C. Stirring is continued for one hour, then the slurry is filtered, the filter cake is washed free of mineral acid and dried in vacuum driers. After softening the dry pigment-in-oil paste on roller mills, a yield of 27.7 parts of paste is obtained.

*Example VII*

A news ink varnish is made by melting 100 parts Wood Rosin F and heating it to 320° F. At this temperature, 200 parts of mineral oil are added and mixed with the molten rosin. The mixture is reheated to 320° F. and stirred for 1 hour until a homogeneous solution is obtained. 12½ parts of the news ink varnish, 20 parts water and ½ part of 29% aqua ammonia are stirred or shaken until a homogeneous emulsion is formed, then added to a pigment slurry containing 13.1 parts of resin-coated chromium-Rhodamine B phosphotungsticmolybdic acid toner in 3500 parts of a very acid solution (of a pH of about 2) at 60° C. Stirring is continued for 3 hours, then the slurry is filtered, the filter cake is washed free of acid until the pH of the wash water is about 5.0 and dried at 60° C. After softening the dry pigment-in-oil paste on roller mills, a yield of 25.3 parts of paste is obtained.

*Example VIII*

3000 parts of pigment slurry, containing 12 parts of freshly precipitated chromium-Rhodamine B phosphotungsticmolybdic acid toner, of a pH of about 1.6, is agitated at a temperature of about 60° C. and 10 parts of a 10% alcohol-soluble phenol-formaldehyde resin in Solox is added through an immersed tube and stirring is continued for ½ hour. Then an emulsion, consisting of 11½ parts linseed oil varnish, ½ part of 29% aqua ammonia and 25 parts of water, is added through an immersed tube and stirring is continued for one hour. The pH of the oil-coated pigment slurry is about 2.

The yield of pigment-in-oil paste expected is about 23.8 parts, with a pigment concentration of about 50%.

If the washed filter cake is not dried but mixed with water, a stable suspension of oil-coated pigment particles is formed as long as the total volume does not exceed the equivalent of 120 parts of water.

*Example IX*

2 parts of urea-formaldehyde resin dispersion in butanol, containing between 59 to 61% solids, are mixed with 4 parts of Solox. This diluted resin dispersion is poured through an immersed tube into a pigment slurry of 12 parts of freshly precipitated chromium-Rhodamine B phosphotungsticmolybdic acid toner in 3000 parts of a very acid solution (of a pH of about 1.6). Stirring of the pigment slurry is continued for one hour, then, while still stirring, an emulsion consisting of 11½ parts linseed oil varnish, ½ part of 29% aqua ammonia and 25 parts water is added through an immersed tube and stirring is continued for an additional hour. The pH of the oil-coated pigment slurry is about 1.8.

The yield of pigment-in-oil paste expected is 24 parts, containing about 50% pigment.

If the adsorption of urea-formaldehyde resin is carried out at 40° C., the yield of resin-coated pigment amounts to about 13 parts. Before drying of the filter cake of the resin-coated pigment, stable suspension can be made by mixing it with sufficient water to obtain a pigment concentration of about 10%. After drying of the filter cake, the pigment requires dispersing agents for the formation of stable suspensions. Similarly the oil-coated pigment particles can be mixed with water for the formation of stable suspensions, but after drying of the corresponding filter cake and its processing into a paste, emulsifying agents are required to form similar suspensions.

*Example X*

1 part indene-coumarone resin modified with phenol (Nevillac) is dissolved in 4 parts of Solox and added through an immersed tube to 3000 parts of pigment slurry containing 12 parts of freshly precipitated chromium-Rhodamine B phosphotungsticmolybdic acid toner. Stirring of the pigment slurry is continued for ¼ hour, and then, while still stirring, an emulsion consisting of 11½ parts linseed oil varnish, ½ part of 29% aqua ammonia and 25 parts water is added through an immersed tube and stirring is continued for one hour. The pH of the oil-coated pigment slurry is about 1.8.

The yield of pigment-in-oil paste expected is 24.2 parts, containing about 50% pigment.

*Example XI*

1½ parts dimethylol urea is mixed with 2 parts glycerol at 90°, and when it is completely dispersed, 3 parts Solox are added. This dispersion is added through an immersed tube to 3000 parts of an agitated pigment slurry containing 12 parts of freshly precipitated chromium-Rhodamine B phosphotungsticmolybdic acid toner. Stirring of the slurry is continued for ¼ hour, and then, while still stirring, an emulsion consisting of 11½ parts linseed oil varnish, ½ part 29% aqua ammonia and 25 parts water is added through an immersed tube and stirring is continued for one hour. The slurry of the oil-coated pigment has a pH of about 2.

The yield of pigment-in-oil paste expected is 24.1 parts, containing about 50% pigment.

*Example XII*

2½ parts melamine-formaldehyde resin dispersion in butanol containing between 49½ to 50% solids, are mixed with 4 parts Solox. The mixture is poured through an immersed tube into a pigment slurry of 12 parts of freshly precipitated chromium-Rhodamine B phosphotungsticmolybdic acid toner in 3000 parts of a very acid solution (of a pH of about 1.6). During the addition of the resin solution, the pigment slurry is being agitated and agitation is continued throughout the adsorption process. After ½ hour, an emulsion consisting of 11½ parts linseed oil varnish, ½ part of 29% aqua ammonia and 25 parts water is added through an immersed tube. The pH of the oil-coated-pigment slurry is about 1.8. After one hour, the slurry is filtered, washed and dried under vacuum. The yield of pigment-in-oil paste expected is 24.2 parts, containing about 49½% pigment.

*Example XIII*

2½ parts of a 5 lb.-cut shellac in alcohol (with approximately 1.05 parts dry shellac) is mixed with 7½ parts of a 5% borax solution and is then added through an immersed tube to an agitated pigment slurry of 12 parts of freshly precipitated chromium-Rhodamine B phosphotungsticmolybdic acid toner in 3000 parts of a very acid solution (of a pH about 1.7). Agitation is contained throughout the adsorption process. After ½ hour, an emulsion consisting of 11½ parts linseed oil varnish, ½ part of 29% aqua ammonia and 25 parts water is added through an immersed tube. After one hour, the slurry is filtered, washed and dried under vacuum. The yield of

Example XIV

1½ parts hydroxybenzyl alcohol is dissolved in 8½ parts water and added to an agitated boiling hot pigment slurry of 12 parts of freshly precipitated chromium-Rhodamine B phosphotungsticmolybdic acid toner in 3000 parts of a very acid solution (of a pH of about 1.6). Agitation is continued throughout the adsorption process. After boiling for 2 hours, the pigment slurry is cooled to 60° C. and an emulsion consisting of 11½ parts linseed oil varnish, ½ part of 29% aqua ammonia and 25 parts water is added through an immersed thistle tube. After one hour, the slurry is filtered, the filter cake is washed and then dried under vacuum. The yield of pigment-in-oil paste expected is 23½ parts, with a pigment concentration of about 51%.

Example XV 40 parts of an aqueous phenol-formaldehyde resin dispersion, as described in Example II, are added to an agitated pigment slurry containing 54 parts of Toluidine toner in 1500 parts of acidified coupling solution. The acidification was carried out by first neutralizing the coupling solution and then adding an additional 10 parts of 20° Bé. muriatic acid. After ½ hour, an emulsion consisting of 54 parts Linseed oil varnish (viscosity 9.5 poises), 3 parts of 29% aqua ammonia and 80 parts water was added rapidly through an immersed tube. Stirring of the pigment slurry was continued for one hour, then the slurry was filtered, the filter cake was washed and dried under vacuum. The yield of pigment-in-oil paste expected is 109 grams, with a pigment concentration of about 49½%.

Before drying, the wet filter cake can be mixed with water to form a stable suspension of oil-coated pigment to a maximum volume equivalent to 1100 parts water. If the dilution is carried out to but ½ of the maximum volume, small amounts of cobalt naphthenate solution or solvent can be mixed with the resulting suspension. Paint brush applications of such suspensions form continuous films, which become free of tack within 3 hours and dry completely overnight.

Example XVI 560 parts of pigment slurry, containing 30 parts of freshly precipitated bronze blue, is permitted to settle, then it is washed by decantation until the pH of the resulting slurry is about 1.7. After adjusting the volume, the pigment slurry is stirred and 20 parts of an aqueous phenol-formaldehyde resin dispersion, as described in example II, is added. After one hour, an emulsion consisting of 30 parts ink oil-rosin varnish, 2 parts of 29% aqua ammonia and 50 parts water are added through an immersed tube. After one hour, the pigment slurry is filtered, the filter cake is washed and then dried. A pigment-oil paste of 62 parts with a pigment concentration of about 48½% is expected.

Before drying, the wet oil-coated pigment can be mixed with water to form a stable suspension to a maximum volume equivalent to 450 parts of water.

Example XVII 880 parts of pigment slurry, containing 27 parts of freshly precipitated chrome yellow, is stirred at 35 to 40° C. In order to obviate a change in the hue of the pigment by a drastic change in the acidity of the pigment slurry during the addition of 10 parts aqueous phenol-formaldehyde resin dispersion, simultaneously sufficient muriatic acid, diluted to a volume equivalent to 10 parts of water (usually a mixture of 2.1 parts 20° Bé. muriatic acid and 8 parts of water is required), is added to maintain the pH of the slurry between 6.0 to 6.5. After the addition is complete, the pigment slurry is stirred for one hour, then an emulsion consisting of 15 parts linseed oil, 1 part of 29% aqua ammonia and 35 parts water is added simultaneously with 2 parts of 20° muriatic acid, diluted with 49 parts water, separately and at equal rates, so that the pH is maintained between 6.0 and 6.5. Stirring is continued for one hour, then the slurry is filtered, the filter cake is washed until the filtrate is neutral to litmus and the filter cake is dried under vacuum.

The yield of pigment-in-oil paste expected is 43 parts, with a pigment concentration of about 63%.

If before drying, the wet filter cake is mixed with water, a stable suspension of oil-coated pigment with a maximum volume equivalent to 90 parts of water can be made.

The pretreatment of the freshly precipitated pigment with a resin aids in the subsequent oil adsorption. Apparently, the finely divided resin particles play a part in the degree of dispersion of the pigment particles, but the resin itself should not be considered as a dispersing or emulsifying agent. It is more of an unexpected phenomenon, which undoubtedly depends upon the contact angle of the tiny resin particles and the liquids. It seems that the behavior of suspended tiny particles of a solid in a system of two immiscible liquids is unpredictable; the solid may either cause the formation or the breaking of an emulsion. The resin itself cannot be considered as an emulsifying or dispersing agent, as after drying, the capability to disperse or emulsify the resin-coated or the oil-coated pigment particles has been lost. Though the pretreatment of the pigment slurries with the resin solutions has its advantages, it is not very essential, as suitable pigment-in-oil pastes can be made by just causing the adsorption of finely divided particles of water-immiscible vehicle by the pigment.

What is claimed is:

1. The process of coating an acid stable pigment with an organic water-immiscible film forming material comprising holding pigment particles in an aqueous acid suspension containing no emulsifying agents, mixing with said suspension a minor amount of the water-immiscible film forming material in the form of extremely finely divided particles whereby said pigment particles are coated with said water-immiscible material, maintaining the pH of the mixture of the suspension and the water-immiscible liquid always below 7 during the coating process, the acidity of said mixture serving to avoid any colloidal characteristics of said water-immiscible material after mixture in said acid aqueous suspension, whereby the finished coated pigment particles are free of contamination by emulsifying agents.

2. The process of coating an acid stable pigment with an organic water-immiscible film forming material comprising holding pigment particles in an aqueous acid suspension containing no emulsifying agents, mixing with said suspension a minor amount of the water-immiscible film forming material in the discontinuous phase of an aqueous alkaline emulsion, maintaining the pH of the mixture of the suspension and the emulsion always below 7 during the coating process, the acidity of said mixture serving to break said emulsion forthwith upon its addition to said suspension whereby said pigment particles are coated with said water-immiscible material, and salts formed in the neutralization of the alkaline emulsifying material become dissolved in said aqueous phase, whereby the finished coated pigment particles are free of contamination by emulsifying agents.

3. The process of coating an acid stable pigment with an organic water-immiscible film forming material comprising holding pigment particles in an aqueous acid suspension containing no emulsifying agents, mixing with said suspension a minor amount of the water-immiscible film forming material in the form of an atomized spray of extremely finely divided particles, whereby said pigment particles are coated with said water-immiscible material, maintaining the pH of the mixture of said suspension and said water-immiscible material always below 7 during the coating process, the acidity of said solution serving to prevent any colloid forming tendency of said water-immiscible particles after mixture in said acid aqueous suspension, whereby the finished coated pigment particles are free of contamination by emulsifying agents.

4. The process as set forth in claim 2 wherein the pH of the mixture is always maintained constant with a variation of less than one by addition of an amount of acid equivalent to the amount of base in said alkaline suspended emulsion.

5. The process of claim 2 wherein said organic water-immiscible film forming material is an oil.

6. The process of claim 2 wherein said water-immiscible film forming material includes an oil and an organic liquid solution of a normally solid resin.

ALFRED F. SCHMUTZLER.
DONALD F. OTHMER.

REFERENCES CITED

The following references are of record in the file of this patent:

UNITED STATES PATENTS

| Number | Name | Date |
|---|---|---|
| 1,431,079 | Acheson | Oct. 3, 1922 |
| 1,813,371 | Whatmough | July 7, 1931 |
| 1,832,242 | Risse et al. | Nov. 17, 1931 |
| 1,863,332 | Hailwood et al. | June 14, 1932 |
| 2,460,546 | Stephanoff | Feb. 1, 1949 |